(12) United States Patent
Lakshman

(10) Patent No.: US 7,571,306 B1
(45) Date of Patent: Aug. 4, 2009

(54) APPLICATION MODEL FOR DYNAMIC COMPUTING ENVIRONMENTS IN SOFTWARE SALES CYCLE

(75) Inventor: Thiruvillamalai K. Lakshman, San Carlos, CA (US)

(73) Assignee: Symantec Operating Corporation, Cupertino, CA (US)

( * ) Notice: Subject to any disclaimer, the term of this patent is extended or adjusted under 35 U.S.C. 154(b) by 264 days.

(21) Appl. No.: 11/409,888

(22) Filed: Apr. 24, 2006

Related U.S. Application Data (63) Continuation of application No. 09/888,969, filed on Jun. 25, 2001, now Pat. No. 7,093,113.

(60) Provisional application No. 60/260,611, filed on Jan. 9, 2001.

(51) Int. Cl.
G06F 9/00 (2006.01)
G06F 15/173 (2006.01)

(52) U.S. Cl. .............. 713/1; 713/100; 709/224

(58) Field of Classification Search ............. 713/1, 713/100
See application file for complete search history.

(56) References Cited

U.S. PATENT DOCUMENTS

| | | | |
|---|---|---|---|
| 4,604,064 A | 8/1986 | Boehm et al. | 434/224 |
| 4,925,311 A | 5/1990 | Neches et al. | 364/200 |
| 5,388,993 A | 2/1995 | McKiel et al. | 434/118 |
| 5,394,522 A | 2/1995 | Sanchez-Frank et al. | 395/159 |
| 5,515,524 A * | 5/1996 | Lynch et al. | 703/13 |
| 5,555,370 A | 9/1996 | Li et al. | 395/161 |
| 5,557,732 A | 9/1996 | Thompson | 345/705 |
| 5,668,995 A | 9/1997 | Bhat | 395/674 |
| 5,796,952 A * | 8/1998 | Davis et al. | 709/224 |
| 5,883,954 A | 3/1999 | Ronning | 705/52 |
| 5,894,571 A | 4/1999 | O'Connor | 395/652 |
| 6,009,507 A | 12/1999 | Brooks et al. | 712/28 |
| 6,081,846 A | 6/2000 | Hyder et al. | 709/250 |
| 6,086,377 A | 7/2000 | Pinder et al. | 434/118 |
| 6,182,123 B1 | 1/2001 | Filepp et al. | 709/217 |
| 6,230,200 B1 * | 5/2001 | Forecast et al. | 709/226 |

(Continued)

FOREIGN PATENT DOCUMENTS

EP 745929 A1 12/1996

(Continued)

OTHER PUBLICATIONS

Sekaran Nanja, "User Interface for Dynamic Computing Environment Using Allocatable Resources," filed Sep. 15, 2000, U.S. Appl. No. 09/663,252, 27 pages of specification (including claims and abstract), and 5 sheets of drawings.

(Continued)

Primary Examiner—Suresh K Suryawanshi
(74) Attorney, Agent, or Firm—Campbell Stephenson LLP (57) ABSTRACT

Various method and systems for using a dynamic computing environment to facilitate a sales demonstration of software are provided. One method involves provisioning the dynamic computing environment (DCE), facilitating interaction between a user and software executing on the DCE, and obtaining feedback information from the DCE. The feedback information describes interactions between the user and the DCE. A method of using dynamic computing environments to facilitate a sales demonstration by a sales team and an evaluation by a customer is also provided.

28 Claims, 4 Drawing Sheets

U.S. PATENT DOCUMENTS

| | | | |
|---|---|---|---|
| 6,259,448 B1 * | 7/2001 | McNally et al. | 715/733 |
| 6,393,557 B1 * | 5/2002 | Guthridge et al. | 713/1 |
| 6,507,948 B1 | 1/2003 | Curtis et al. | 717/174 |
| 6,543,047 B1 | 4/2003 | Vrhel, Jr. et al. | 717/121 |
| 6,560,606 B1 | 5/2003 | Young | 707/100 |
| 6,564,112 B1 | 5/2003 | Factor | 700/97 |
| 6,578,141 B2 | 6/2003 | Kelley et al. | 713/1 |
| 6,636,970 B2 | 10/2003 | Akiyama et al. | 713/189 |
| 7,032,229 B1 * | 4/2006 | Flores et al. | 719/328 |
| 7,065,637 B1 * | 6/2006 | Nanja | 713/1 |

FOREIGN PATENT DOCUMENTS

| | | |
|---|---|---|
| EP | 841616 A2 | 5/1998 |

OTHER PUBLICATIONS

Sekaran Nanja, "System for Configuration of Dynamic Computing Environments Using a Visual Interface," filed Sep. 15, 2000, U.S. Appl. No. 09/662,990, 23 pages of specification (including claims and abstract), and 2 sheets of drawings.

Simon—"Computer System Built to Order"—Nov. 25, 1996—Newsgroups: demon.adverts, midlands.adverts, sanet.adverts, solent.forsale, uk.adverts.computer, unet.adverts, uk.adverts.other, dungeon.forsale.

* cited by examiner

APPLICATION MODEL FOR DYNAMIC COMPUTING ENVIRONMENTS IN SOFTWARE SALES CYCLE

CROSS-REFERENCES TO RELATED APPLICATIONS

The present application is a continuation of U.S. patent application Ser. No. 09/888,969, entitled "Application Model for Dynamic Computing Environments in Software Sales Cycles," filed Jun. 25, 2001 now U.S. Pat. No. 7,093,113, and naming T. K. Lakshman as inventor, which claims the benefit of priority under 35 U.S.C. § 119 from the provisional patent application, U.S. Provisional Patent Application No. 60/260,611, filed on Jan. 9, 2001. The aforementioned applications are hereby incorporated by reference as if completely and fully set forth herein.

This application is related to U.S. Non-Provisional patent application entitled "User Interface for Dynamic Computing Environment Using Allocateable Resources" Ser. No. 09/663,252 filed on Sep. 15, 2000, page no. 1-27, FIGS. 1-5, U.S. Non-Provisional patent application entitled "System for Configuration of Dynamic Computing Environments Using a Visual Interface" Ser. No. 09/662,990 filed on Sep. 15, 2000, page no. 1-23, FIGS. 1-2, and U.S. Non-Provisional patent application Ser. No. 09/861,483 filed on May 17, 2001 entitled "Dynamic Computing Environment Using Remotely Allocable Resources", all of which are hereby incorporated by reference, as if set forth in full in this document, for all purposes.

BACKGROUND OF THE INVENTION

The present invention relates in general to digital processing and more specifically to a model for the use of dynamic computing environments in the sales cycle of software vendors.

Sales teams of organizations that sell software go through a cycle of internal preparations, product demonstrations to potential customers, product evaluations by customers, feedback from customers, and transition of ownership through an installation/customization process.

During the stages of internal preparations and product demonstrations, software vendors as well as their customers often face issues such as lack of availability or difficulty in managing computing environments when installing software on specific computers. Additionally, the installation of software on computers can be time consuming and extremely complicated. Often, administrators must be used to install the software. This is especially true as computer systems become more and more complicated. With the advent of the client-server software model, demonstration and evaluation of a software system requires execution on a network of heterogeneous computers. For instance, an e-business software system consisting of a web-server, an application server, and a database server would require a network consisting of at least one web-server to handle requests from clients, in addition to one or more application servers and one or more database servers. These networks require capital expenditures for infrastructure that a company may not want to commit to without first knowing whether the software and hardware will fit its needs. Therefore, customers may be reluctant to test and evaluate software if expenditures need to be made in order to perform evaluation leading to subsequent sale. Also, customers will be especially reluctant because setting up evaluation systems takes considerable time and effort. Additionally, some evaluation systems may not be needed after evaluation and may become useless. Thus, customers may not want to commit to initial capital expenditures associated with installing, configuring, and testing the software during the evaluation phase.

Additionally, customers may not even want to use their own computers to test and evaluate software. Customers may be afraid of corruption or crashes affecting their pre-existing network. Thus, a sales team may not even be allowed to install a software product at a customer's site. And even if customers do install the software on their own computers, the computing environment most likely will be isolated from the customer's network in order to isolate their network from corruption or crashes associated with the software. Thus, extra precautions are needed to install software at a customer's site.

During a demonstration phase, a sales team can demonstrate the software from a computer with the software installed on it. This requires that the sales team and customer be physically present in the same locality. Alternatively, a sales team may demonstrate the software from a remote location and have the customer view the results of the execution of the software through a web browser or other interface. In both of these cases, the sales team and customer are restricted in their usage of the software. In the first case, the sales team and customers must be in the same location in order for a demonstration to take place. In the second case, the customer can only view the results of the software process and cannot interact directly with the process. In both cases, a pleasant customer experience during evaluation of a software product is predicated on minimal time and effort to set up the evaluation, together with the flexibility to experiment with the software.

During an evaluation phase, a customer must typically download the software from a disk, CD, vendor's web site, etc. The software is then installed on the customer's computers and the evaluation phase can begin. After the customer's installation of the software, the vendor has no interaction with the customer's use of the software. Thus, if problems with the installation, subsequent configuration, or use occur with the software, a vendor's only option is to send a support provider out to the customer's site or to try and fix the problem over the telephone. In most scenarios, the problem cannot be fixed immediately and the customer may lose valuable evaluation time, decide not buy the software, or buy another product.

Also, because the vendor has no interaction with the customer's use of the software, the vendor cannot track customer usage for quantity and quality, usage time and periods, patterns of usage, trouble spots, system failures, etc. The only tracking that is typically possible is through post-evaluation feedback, which is slow, subjective, and inaccurate. This feedback does not help the vendor to pro-actively alleviate the customer's concerns about the features and capabilities of the software and often leads to an unsatisfactory customer experience with the software. Furthermore, the tracking process is inefficient because it is not completely automated. Also, effective feedback may result in a configuration change or tuning of the software and the evaluation phase may have to be repeated. In such case, prior art models lead to under-utilization of resources between the two evaluation phases by the replication of set-up time and effort preceding each evaluation.

Typically, software must be customized for a specific customer's needs. However, customization is often not performed due to lack of resources and lack of incentive (due to the vendor's inability to determine whether or not the result of an evaluation would lead to a sale and consequently recognizable revenue). Often, customers are asked to "believe in good faith" that the software, when purchased, would indeed be deployed per the customization needs of the customer. However, post sale deployment often involves time and effort on the customer's part, thus risking the customer's own products and services that potentially depend on the use of the software. The entire software sales cycle, from pre-sale demonstration through evaluation to post sale deployment may take around four to six months, which in the present days of shrinking software life cycle is unacceptable.

During the transition of ownership through an installation/customization process, configurations for purchased software may be different from the configuration used in the testing environment. Additionally, the testing computing environment may have been isolated from the customer's active network. Thus, re-installation of the software will have to be performed each time the software in the customer's active network changes. Therefore, additional problems may occur during re-installation. Also, the transition will not be seamless because the software cannot be automatically used by the customer on their network. Typically, reasons include that the software needs to be integrated with the customer's own software and third party components and the software needs to be tuned for performance.

The efficiency of a sales team in all of the above phases is necessary and important to sell software. With the proliferation of software companies, a customer may have many choices for a desired software application. Thus, any delay may cause the sales team to lose the potential contract because some customers cannot afford to lose development time and must have software systems running immediately.

BRIEF SUMMARY OF THE INVENTION

Various method and systems for using a dynamic computing environment to facilitate a sales demonstration of software are provided. One method involves provisioning the dynamic computing environment (DCE), facilitating interaction between a user and software executing on the DCE, and obtaining feedback information from the DCE. The feedback information describes interactions between the user and the DCE. A method of using dynamic computing environments to facilitate a sales demonstration by a sales team and an evaluation by a customer is also provided.

In another embodiment, a method of using a dynamic computing environment to facilitate a sales demonstration of first software is provided. In another embodiment, a method of using a dynamic computing environment to facilitate a user's evaluation of software is provided. In another embodiment, a method for facilitating a transition of software to a remote customer using a dynamic computing environment is provided.

In one embodiment, a system for facilitating a sales demonstration of one or more configurations of first software, the demonstration performed by a sales team for one or more customers is provided. The system comprises a system for configuration, provisioning, and access of the one or more dynamic computing environments, a set of available resources including a hardware, a software environment, and network resources, a first set of one or more dynamic computing environments created by the sales team using the set of available resources, and a set of copies of the one or more configurations of the first software, wherein each copy in the set of copies run on a separate dynamic computing environment in the one or more dynamic computing environments. Additionally, the provisioning comprises allocation of resources for the one or more dynamic computing environments from the set of available resources. Further, the access comprises access to the one or more dynamic computing environments by the sales team, and access to the one or more copies of the first software by the one or more customers through the dynamic computing environment.

A further understanding of the nature and advantages of the invention herein may be realized by reference of the remaining portions in the specifications and the attached drawings.

DETAILED DESCRIPTION OF THE INVENTION

One embodiment of the present invention allows fast, efficient selection and configuration of processing networks, which can then be accessed and managed remotely. The processing network is referred to as a system including "resources." A system resource is any hardware, software, or communication components in the system. For example, discrete hardware devices include processing platforms such as computers or processors, mobile/laptop computers, embedded computing devices, hand-held computers, personal digital assistants, point-of-sale terminals, smart-card devices, storage devices, data transmission and routing hardware etc., without limitation. Additionally, computer peripherals such as monitors, input/output devices, disk drives, manufacturing devices, or any device capable of responding to, handling, transferring or interacting with digital data are also resources. Software, or any other form of instruction, is executed by processors in the system and is also a type of resource. Finally, communication resources are also part of the system such as a digital network's hardware including the network's configuration and topology, where control of the network is provided by software and/or hardware. Additionally, the network may be based on wired connections or wireless connections. For instance, the network hardware and software may be based on Bluetooth wireless standards.

For example, a processing network of a general consumer might include a PDA and a cell phone, each connected by wireless channels to a single personal computer, which in turn is connected to an email server at a remote location through the Internet. As another example, a processing network might include a personal computer running Microsoft Windows 98 operating system, a lap-top computer running Linux operating system, and another personal computer running Windows NT operating system along with router and firewall software, wherein all three computers are connected using a local Ethernet hub, and the router software routes connections to the Internet.

According to an embodiment of the present invention, the resources for such a processing network are fully selectable and allocable by a system architect. In a specific embodiment, a primary company, Jareva Technologies, Inc.® provides proprietary technology to a system architect for designing a system by allocating resources and specifying how the resources are to be used. The system architect can be an individual, corporate entity, etc. The system is referred to as an "environment"—or more specifically as a "computing environment" and the primary provider of such an environment is referred to as an Environment Service Provider (ESP). A typical system architect is referred to as the "customer." The primary provider obtains revenue for providing the resources and the tools to easily select, allocate, configure and run the environment.

The specific embodiment of the present invention allows fast allocation and configuration of resources such that different environments can be created from the same resources within minutes, or even seconds. This allows "time sharing" of overall resources so that a first environment can be "alive" or operative for a time period defined by the system architect (e.g., daily two-hour slot), followed by second, third and fourth environments being instantly created for the next four hours for three different customers, and so on. After a time period expires, such environments might either manually or automatically de-allocate such resources. Since these "computing environments" can be dynamically configured and re-configured out of the same set of resources, these will also be referred to as "Dynamic Computing Environments".

In particular, environments without any computing devices i.e., environments made only of networks, will also be referred to as "virtual networked environments" or simply as "virtual networks".

A specific embodiment allows customers to create a computing environment from a remotely-accessible user interface such as a web page on the Internet. Thus, the customer can create, modify and operate the environment from anywhere in the world. Since the resources, in turn, can communicate over networks, including the Internet, this approach eliminates the cost of shipping hardware and software. Hardware and software designers, programmers, testers or other personnel using an environment according to the present invention can, similarly, be located anywhere in the world such that labor costs are optimized.

The creation of dynamic computing environments ("DCE") is automatic. For example, a customer can request a web-site simulator using twelve web-page servers on a Microsoft® NT platform, two disk arrays at a specific bandwidth and storage capacity, two caching servers and 200 clients running Netscape Navigator™ under Microsoft Windows® 2000 using Pentium III™ processors at under 800 MHz. Such an environment is created and destroyed, and even re-created automatically, without human intervention each time. Unlike the conventional computing infrastructure, according to an embodiment of the present invention there is no need to physically couple or de-couple, each physical machine or resource to each other upon adding or removing such resources. There is no need to set-up Internet Protocol (IP) addresses or other network settings, or install operating systems and associated application programs on one or more physical machines. All such activities on a DCE can be performed automatically without user intervention.

According to an embodiment of the present invention, the DCE is a virtual computing system including a network comprising a number of distinct types of machines and a network connecting them. For example, a system architect might require a DCE to include a Sun Sparc running a certain version of Solaris O/S coupled to a Linux machine. The present invention enables the separation of the activity of designing a DCE, from the activity of actually creating the DCE. Designing a DCE includes choosing the specific hardware, choosing the operating systems or other software, and choosing the specific interconnections, etc. Creating a DCE includes allocating the resources, installing the operating systems and other software, etc. Furthermore, the present invention automates the process of creating the DCE. A DCE for which resources have not been allocated yet will also be referred to as a virtual computing environment. Similarly, a computing device (or a subnet) that is part of a DCE will also be referred to as a virtual computing device (or a virtual subnet), if the required resources for the computing device (or the subnet) have not been allocated yet.

An embodiment of the present invention provides a framework that enables configuring, and provisioning DCEs remotely. Configuring a DCE involves choosing the resources and their interconnections. The present invention supports operations for making such design choices through appropriate programmable interfaces. The interfaces can be used interactively through a graphical user interface such as a web page or non-interactively through a program script. Provisioning a DCE involves allocation of physical resources required for a DCE to function. The present invention manages the physical resources needed for provisioning DCEs and supports operations for allocating/de-allocating these resources. In one embodiment of the present invention, the framework for provisioning DCEs is implemented as a distributed system consisting of different software programs running on different computers and networking hardware. Software, or any other form of instruction, is executed by processors in the system. A computer system used to implement the framework can include various computer readable storage media such as a disk drive, CDROM drive, and random access memory (RAM). In a further embodiment, the present invention permits "virtual" hosting of dynamic computing environments. As used herein, the term "virtual" specifies that neither the requisite devices nor the network need to be physically accessible to users. Further, in accordance with this embodiment, the hosting process may be initiated or terminated by users at will, from any geographic location. Thus the administrative framework allows users to remotely configure and provision DCEs.

A further understanding of embodiments of the present invention will be gained with reference to the diagrams and the descriptions that follow.

An embodiment of the present invention shortens the cycle and reduces transition costs for both a software vendor and a customer. The cost reduction is achieved by effective, short-term utilization of computing resources enabled by use of DCEs. The shortening of sales cycle is achieved by the ability to allocate and use remote computing environments. In one embodiment, a system for allocating and accessing the computing environments is described in U.S. Non-Provisional patent application Ser. No. 09/861,483 filed on May 17, 2001 entitled "Dynamic Computing Environment Using Remotely Allocable Resources". Furthermore, DCEs used during the sales cycle also enable secure access to computing resources that can be shared between the customer and the vendor. Such interactive access increases the odds of success for the vendor and decreases the burden of evaluation for the customer. Additionally, using DCEs in the sales cycle also enables tracking of user behavior and feedback in real-time, which is not possible using prior art methods.

Figures 1, 2:
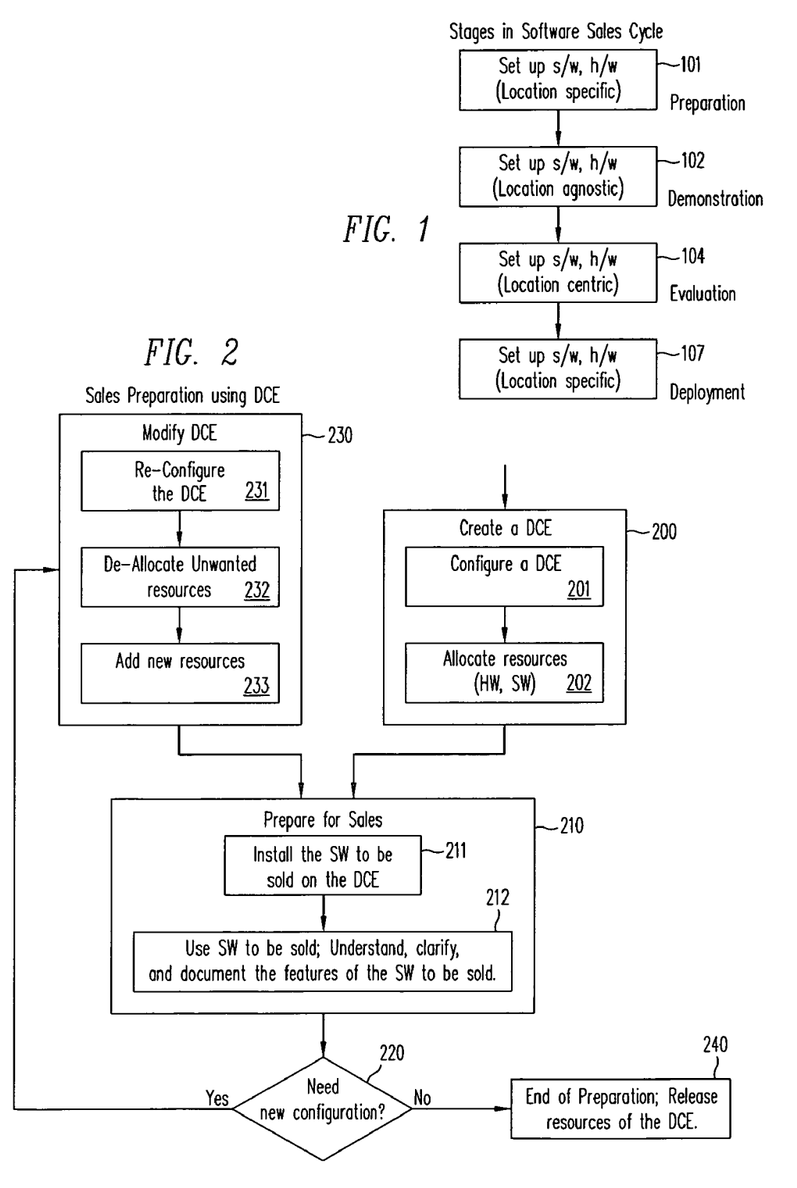
FIG. 1 illustrates different phases of a software sales cycle.
FIG. 2 illustrates a method for using DCEs for sales preparation according to one embodiment.

Referring to FIG. 1, DCEs can be used to facilitate all stages of a software sales cycle. In one embodiment, the sale of software can go through a cycle of sales team preparation 101, demonstration of the software to possible customers 102, customer evaluation and feedback 104, and deployment of software to a customer 107—all using one or more DCEs.

The preparation phase 101 of the sales cycle is location-specific, i.e., the preparation has to be done by the sales team and thus, the sales team needs access to the computing resources. During preparation for the sale of software, sales teams familiarize themselves with the software being offered for sale. Thus, software is installed on applicable computing systems in order to simulate working environments. Additionally, software may be configured in various ways on various combinations of hardware and network configurations. The DCE may be configured to encompass the various combinations. For example, the software can be tested on a Windows PC, a Linux machine, and on a Solaris machine. A DCE may be created by allocating the different machines needed.

The DCE may be configured in the various ways without committing any local resources of the sales team. In other words, the sales team only needs a computing device with a user interface and an Internet connection to become familiar with the various software configurations. The sales team may interact with the different configurations with the same computer using multiple user interfaces or with multiple computers using single user interfaces for each configuration. In both cases, the software does not need to be installed on local systems and local resources are not burdened with the various software, hardware, or network configurations. Additionally, potential capital expenditures for the various hardware and network configurations can be avoided by allocating resources in the DCE. In contrast, if actual machines were purchased so the sales team could familiarize themselves with the software, the machines may not be used after the sales team is finished with the machines. Also, the sales team may wish to change a configuration once the software has been tested. The new configurations may require additional resources that would need to be purchased by the sales team. However, the DCE allows for reconfiguration using the desired resources allowing the sales team to continue familiarizing themselves with the software.

In one example, distributed system software may have to be tested on three different networks: a network including one or more client computers running Windows 98 or Windows NT and at least one server computer running Solaris; a second network including one or more client computers running Windows 98 or Windows NT and at least one server computer running Windows 2000; and a third network including one or more client computers running Linux and at least one server computer running Solaris. The three networks may be configured using the DCE with three networks that are isolated from each other. Thus, the respective computing resources needed for the networks may be allocated accordingly.

The need for the various configurations can be short-term because once a sales team learns the software and the issues involved in installation, further familiarization will not be needed. Thus, using the DCE, the computing systems may be abandoned. Therefore, in one embodiment, the sales team allocates resources for the first network, completes the preparation, de-allocates the resources, allocates resources for the second network, completes the preparation, de-allocates the resources, allocates resources for the third network, completes the preparation, and de-allocates the resources. FIG. 2 illustrates the steps of this process for one specific instance according to one embodiment.

FIG. 2 shows a method of sales preparation according to one embodiment. In step 200, the DCE is created by configuring the DCE with the desired software, hardware, and network configurations (step 201); and allocating the required resources (step 202). The sales team may perform these steps remotely, if needed, using a web browser, equivalent client, or an interface as described in "User Interface for Dynamic Computing Environment Using Allocateable Resources" Ser. No. 09/663,252 filed on Sep. 15, 2000 and U.S. Non-Provisional patent application entitled "System for Configuration of Dynamic Computing Environments Using a Visual Interface" Ser. No. 09/662,990 filed on Sep. 15, 2000.

In step 210, preparation for sales is made. Once the DCE is configured, the sales team can install the software being sold on the DCE (step 211) and then proceed to test and familiarize themselves with the software (step 212). Those who are skilled in the art will appreciate that although software installation can be part of the DCE creation step, the sales teams would prefer to go through the installation process to become familiarized with the process.

If additional configurations are desired (step 220), the process can proceed to step 230, where commands may be sent to modify the DCE: Thus, the step of adding configurations to the DCE or re-configuring the DCE (step 231), de-allocating resources not needed for further usage (step 232), and allocating additional resources, if needed, may be performed (step 233).

If additional configurations are not needed, the process ends and the allocated resources can be released as in step 240.

Sales teams may also demonstrate the software product to customers using the present invention. The demonstration phase 102 in FIG. 1 is location agnostic i.e., the demonstration may be performed in the vendor's location, in a customer's location, or in a third location where the vendor can demonstrate the software to multiple customers. Using the DCE for demonstrations provides advantages such as allowing both the sales team and customer access to the actual resources of the DCE. During a demonstration to customers, the sales team can demonstrate the software on one configuration or alternatively on multiple configurations. Additionally, the sales team can configure one resource of the DCE with their software and another resource with a competing vendor's software allowing the comparison of competing software. Using the DCE, the sales team can allocate resources with the desired software and configurations in a remote computing environment without requiring loading of any of the configurations at the customer site. Thus, the software may be demonstrated at customer's sites without the burden of having to install software on a computing environment at the customer site or requiring a customer to purchase any computing equipment.

If comparison with a competitor's software is desired, a command may be sent to configure the DCE with the competitor's software/hardware configuration. The sales team may then demonstrate the competitor's software using the DCE. In an alternative embodiment, the competitor's software may be loaded along with the sales team's software and both can be demonstrated simultaneously allowing for a true comparison.

Additionally, the sales team may perform demonstrations to remote customers using the DCE. Resources are allocated on the DCE with the software to be demonstrated. Signals can be sent to a processor in the DCE indicating that the interactions with the software process should be shared or shown to the customers. In other words, when a user interacts with the software on the DCE, signals are sent to each user interface enabled to receive signals indicating the interaction with the software. Thus, both the customer and sales team may view the demonstration on their respective user interfaces. Also, additional customers may be added to the demonstration and can view the demonstration through a user interface.

Customers can also obtain control of the allocated resources and software processes of the DCE even though the customers are in a remote location. Thus, the customers can interact with the software process without being physically present with the sales team or the software. Additionally, customers can send signals to the DCE to reconfigure the allocated resources with different software/hardware configurations. An advantage of having resources that are shared remotely is the sales team does not have to be physically present in the same location as the customer. In prior art, a sales demonstration may be performed from a remote location where a customer can view what the sales team is demonstrating; however, the customer would not have control of the exact resources or software process that were being demonstrated. Thus, a customer would have to rely on the sales team to interact with the software process. By having shared access to the resources, the demonstration is enhanced as customers may interact and test the software themselves.

Furthermore, all access to the software being demonstrated and the environment in which it is being demonstrated will be secure and isolated. Secure access ensures that an unauthorized user cannot access the environment or the software. Unauthorized users will not be able to capture any unauthorized information. Isolated access ensures that access by a first customer does not interfere with access by second customer. Thus, DCEs can be used for different live interactive demonstrations to multiple customers simultaneously without loss of security and isolation guarantees. Prior art models do not enable a way for shared but secure demonstrations.

Figure 3:
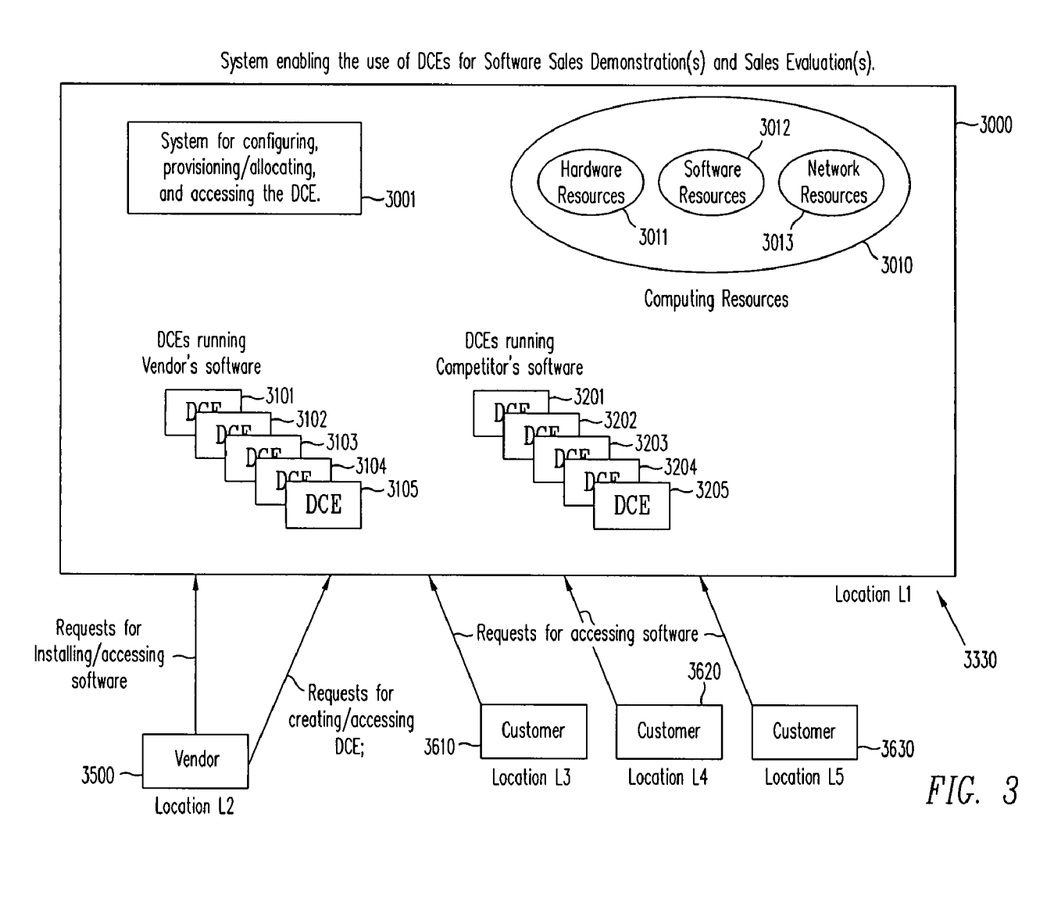
FIG. 3 illustrates a system for using DCEs for sales demonstration(s) and sales evaluation (s) according to one embodiment.

FIG. 3 illustrates a system 3000 that facilitates a sales demonstration according to one embodiment. Customer locations L3, L4, and L5 (3610, 3620, and 3630) may be in the same location or in different locations. Location L2 (3500) may be different from the customer locations L3, L4, and/or L5. Location L1 (3300) may be in the same location as a vendor's location L2 (3500) or may be in the same location as customer locations L3, L4, and/or L5, or may be in a different location from both the vendor's L2 and the customers' locations L3, L4, and/or L5. In all these cases, the system 3000 enables remote operation, remote configuration, allocation, and access to the DCE by the vendor, remote installation, and access of the software by the vendor, and remote access of the software by one or more of the customers.

Remote requests for creating and accessing the DCE are sent to a system 3001 for configuring, provisioning, and accessing DCE. The vendor may install their software in one or more DCEs 3101, 3102, etc.

In the embodiment, different DCEs may be used for different configurations of the software. Additionally, each DCE may be reserved for a separate customer enabling simultaneous demonstrations to different customers. Since customers may want to interact with the software, using separate DCEs enables secure access to individual installations of the software by customers. If the software is a distributed system, then using DCEs will also ensure that different copies of the software do not interfere with each other. The vendor may also install one or more competitors' software in one or more DCEs 3201, 3202, etc. This enables concurrent access of the different software by the same customer for comparison purposes. Fair comparison of different software of similar functionality usually requires the use of environments that are exactly the same except for the software being compared.

Figure 4:
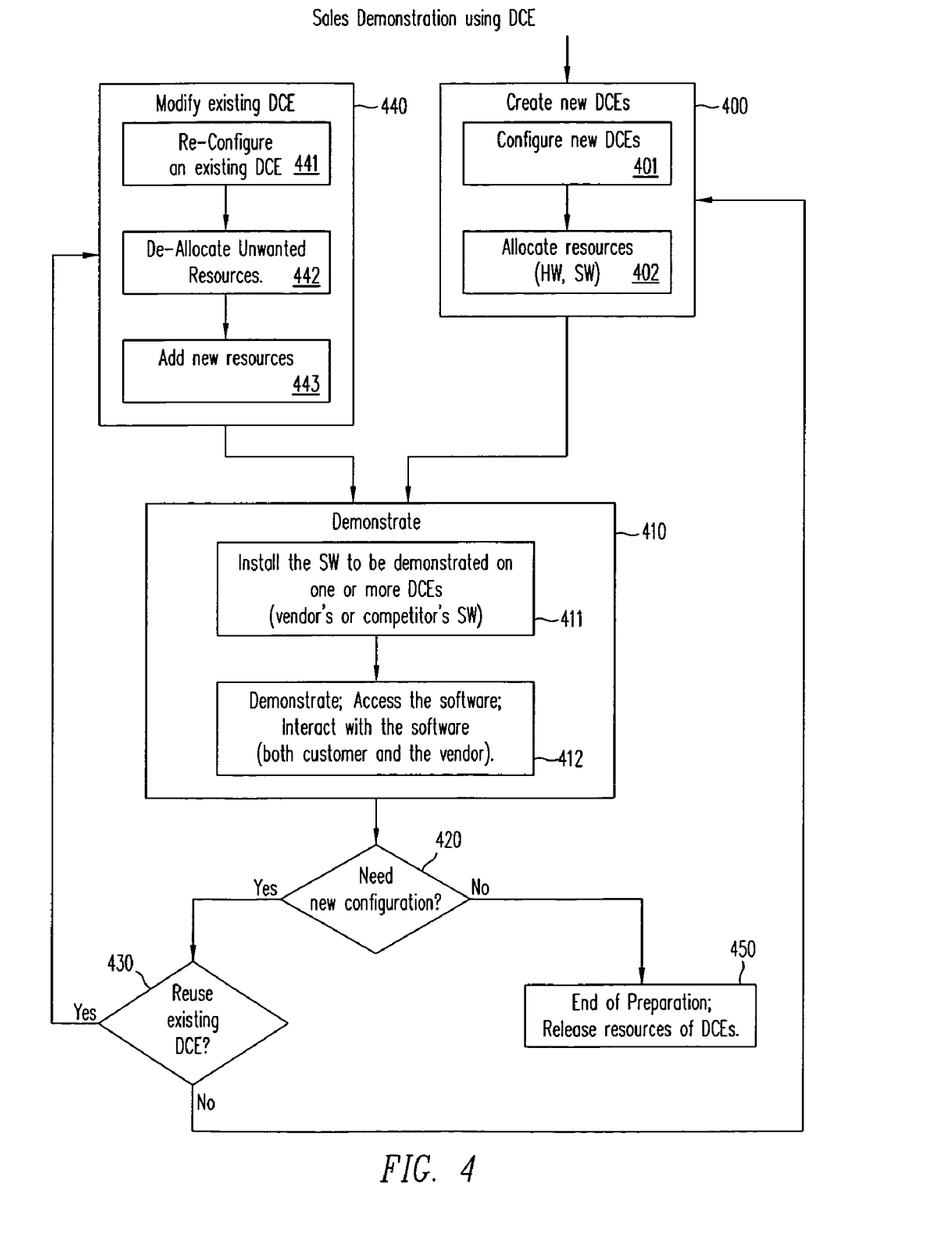
FIG. 4 illustrates a method for using DCEs for sales demonstration(s) according to one embodiment.

FIG. 4 illustrates a method of facilitating a sales demonstration of software according to one embodiment of the present invention. In step 400, a command is sent to install the software on resources representing the desired network configurations. In response, new DCEs are configured (step 401) and resources are allocated (step 402). In one example, software may be loaded on one configuration, or in another example, software may be loaded on multiple configurations.

In step 410, the sales team may then demonstrate the software using the allocated network and software configurations. Thus, software that is to be demonstrated may be installed on one or more DCEs (411). In step 412, the software may be accessed and demonstrated. In one embodiment, signals are sent from the sales team's user interface to a processor in the DCE, which executes the commands.

If multiple software/hardware configurations are desired (step 420), a command may be sent to configure a new DCE and allocate a new set of software/hardware configurations depending on if the user desires to use the existing DCE (430). If the user does not, a command may be sent to modify an existing DCE (441), de-allocate unwanted resources (442) and add further resources (443) as shown in step 440. If the user does, the process returns to step 400. In an alternative embodiment, some or all of the multiple software/hardware configurations may be allocated during step 400. Thus, the demonstrations can be held simultaneously or in series. Accordingly, multiple customers can be shown different software/hardware configurations at the same time.

The DCE may also be used for customer evaluation of the software. If different configurations are needed, the different configurations may be allocated on the DCE. Then, customers may evaluate the software using a user interface located on a computer, such as a web browser. Advantages are provided in that customers may evaluate the software without having to expend any time or resources installing the software and the software is isolated from the customer's work environment. Installation of resources may take many man-hours and may not even be accomplished at all. A customer may not want to commit the man-hours or go through a complicated installation just for evaluation.

Additionally, customers may be more willing to try out a product if initial expenditures involved in setting up the appropriate computing systems are not needed. Thus, the use of a DCE to automatically install and configure the software alleviates those disadvantages. Additionally, customers typically prefer trial software installations to be isolated from their work environment. In one example, evaluation configurations involve crash and burn scenarios designed to thoroughly test the software's stability. However, the crash and burn scenarios may cause network problems when they crash, such as slowing down the network or actually crashing the network. These configurations are not useful after the evaluation phase and are usually discarded. Thus, customers may not want to install the required configurations to test the software in their local environment. DCEs alleviate these concerns by allowing customers access to remote resources that may be allocated automatically through a user interface and are isolated from the customer's work environment. DCEs also enable transition from evaluation to deployment by capturing configurations and customization work done during evaluation and migrating it to the deployment environment. DCEs provide software environments customized for specific customer's needs and enable rapid deployment of a distributed collection of software components on distinct hardware.

Also, tracking of customer usage of the software is facilitated using the DCE. Typically, post-evaluation feedback from customers is used to evaluate software. However, waiting for post-evaluation feedback may not be effective to fix problems that other customers are having. Additionally, the sales team may not be able to reproduce problems the customers faced during evaluation. Thus, a system using the DCE where the customers and sales team have shared access to the software process and allocated resources can be used to provide feedback in real-time. Additionally, shared access of the resources allows the tracking system to track the usage of software in categories such as usage time, usage patterns, hot spots, etc. Additionally, tracking these categories is facilitated by having secure and shared access to the computing environment hosting the software.

Monitoring of software behavior may also be facilitated using the DCE. During monitoring, problems that are detected may be addressed. For example, a customer may encounter a bug in the software. If the customer had installed the software on a local computing environment, the customer would have to contact the sales team or stop testing. However, because the sales team has access to the allocated resources of the DCE, the sales team can fix the problem directly. Repeated failures and exceptional behavior of the software may lead to reconfiguration of the software, which may be quickly addressed because the sales team has access to the installation through the DCE.

Figure 5:
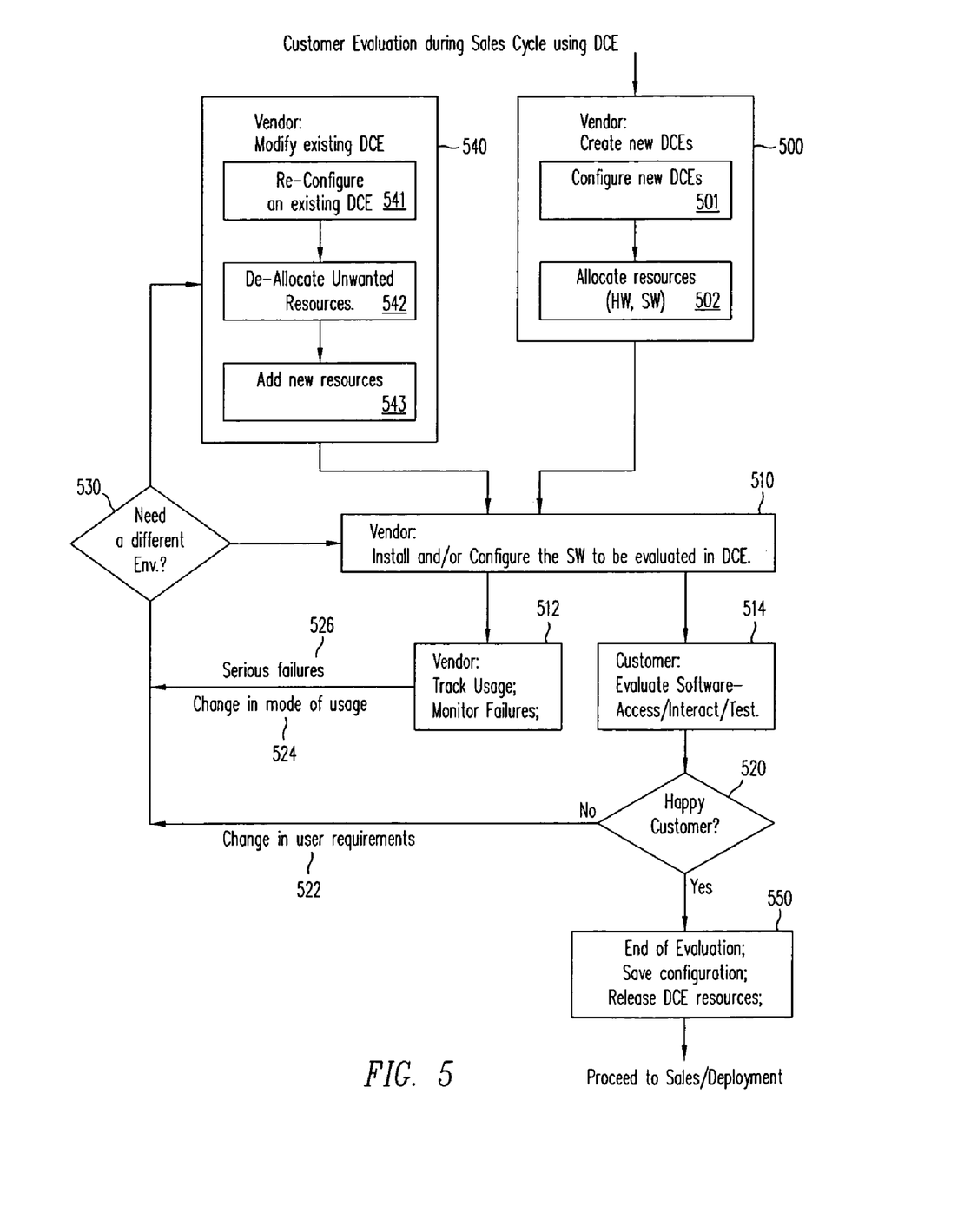
FIG. 5 illustrates a method for using DCEs for customer evaluation during software sales according to one embodiment.

FIG. 5 illustrates a simplified example of a method of evaluating software according to one embodiment. In step 500, a command is sent by the vendor to configure the DCE (501) and allocate the required resources (502). In step 510, the vendor can install and configure the software to be evaluated on the DCE. Then, the customer can interact with the software process on the DCE (step 512). Additionally, signals indicating the user's actions with the software are sent to the sales team (step 514). Thus, the sales team receives the user's interactions in real-time. It should be understood that the customer and sales team can be in the same location or in different geographical locations.

The sales team may receive feedback either from the customer (520) or through the tracking/monitoring software (522, 524, and 526). Based on the feedback, the sales team decides (530) whether the environment needs to be changed. If so, the sales team modifies the DCE (step 540) by reconfiguring the existing DCE (541), de-allocating unwanted resources (542), and adding new resources (543). The software is then installed again (step 510). If not, the sales team either reinstalls or reconfigures the software on the same unmodified DCE (step 510). In the end, if the system is stable and the customer is satisfied and does not require any changes to the software, the configuration may be saved and the DCE resources may be released (step 550).

Additionally, in one embodiment, evaluation of the software by multiple customers is enabled by installing one or more copies of the software on one or more DCEs.

Transition from the sales cycle to customer ownership may be facilitated using the DCE for post-sale deployment. For example, if the software had been installed on the DCE already, upon the sale of the software, all rights may be immediately transferred to the customer. Also, if the software had not been installed, installation may be facilitated by either the sales team or the customer by sending a command to the DCE to automatically configure the environment. Once receiving the command, the DCE is automatically configured with the desired hardware/software configurations and the customers can begin using the software once the configuration is complete. Thus, by using a DCE to automatically configure the computing environment, many possible installation and execution problems are eliminated such as dependencies on third party software, dependencies on certain software such as a database being deployed in specific manner, and dependencies on software having certain specialized functionalities in order to be integrated and used with other software modules. The customer does not have to perform maintenance on the computing environment and customer support can be extended by the sales team because they have access to the computing environment also.

According to one embodiment of the present invention, a DCE may be used for all phases of the software sales cycle illustrated in FIG. 1. If the same DCE is used first for preparation, followed by demonstration, followed by evaluation, and finally for deployment, then the transition may be faster, easier, and cheaper for both the vendor and the customer. The reduction in time and effort is achieved by eliminating the work involved in setting up hardware and software in each of the steps 101, 102, 104, and 107 shown in FIG. 1.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope and equivalents.

What is claimed is:

1. A method comprising:
   provisioning a dynamic computing environment (DCE), wherein
      the DCE comprises a network,
      the provisioning the DCE comprises provisioning hardware and software, and
      the software is executed by the hardware;
   facilitating interaction between a user and the software;
   obtaining feedback information from the DCE, wherein the feedback information describes a plurality of interactions between the user and the DCE.

2. The method of claim 1, further comprising:
   based on the feedback information, performing one of: reconfiguring the software, re-installing the software, or modifying the dynamic computing environment.

3. The method of claim 1, wherein the obtaining the feedback information comprises obtaining the feedback information from a tracking and monitoring software program executing on the dynamic computing environment.

4. The method of claim 1, wherein obtaining feedback information comprises:
   tracking the one or more interactions between the user and the software; and
   sending information from the dynamic computing environment identifying the one or more interactions.

5. The method of claim 4, wherein the information comprises at least one of: usage information identifying an amount of usage time for the software, usage pattern information identifying usage patterns for the software, or feature information identifying one or more features of the software that the user is interacting with proportionally more than other features of the software.

6. The method of claim 4, further comprising:
   monitoring the behavior of the software, and
   sending behavior information from the dynamic computing environment, wherein the behavior information identifies the behavior of the software, including any failures of the software.

7. The method of claim 1, further comprising using the dynamic computing environment to transition from a sales cycle to customer ownership, wherein
   the using the dynamic computing environment to transition from the sales cycle to customer ownership comprises saving a preferred configuration of the dynamic computing environment for the software.

8. The method of claim 7, further comprising:
   providing post-sale customer support for the first software through the dynamic computing environment.

9. The method of claim 1, further comprising:
   reprovisioning the DCE, wherein the reprovisioning comprises uninstalling the software and installing new software.

10. A method comprising:
    automatically provisioning a dynamic computing environment (DCE) according to a first configuration, wherein the DCE comprises a network;
    facilitating interaction between the dynamic computing environment and a sales representative, wherein the sales representative interacts with the dynamic computing environment to perform at least one of: installing software and operating the software in the first configuration of the dynamic computing environment; and
    automatically provisioning the dynamic computing environment according to a second configuration.

11. The method of claim 10, further comprising:
    receiving user input specifying the first configuration, wherein
    the dynamic computing environment is automatically provisioned according to the first configuration in response to receipt of the user input.

12. The method of claim 11, further comprising:
    receiving additional user input specifying the second configuration, wherein
    the dynamic computing environment is automatically provisioned according to the second configuration in response to receipt of the additional user input.

13. The method of claim 12, further comprising:
    facilitating interaction between the dynamic computing environment and the sales representative, wherein the sales representative interacts with the dynamic computing environment to perform at least one of: installing software and operating the software in the second configuration of the dynamic computing environment.

14. The method of claim 10, further comprising:
    generating monitoring information describing one or more interactions between a customer and the software; and
    providing the monitoring information to the sales representative.

15. A computer readable storage medium storing program instructions executable to:
    provision a dynamic computing environment (DCE) comprising a network, wherein
        provisioning the DCE comprises provisioning hardware and software,
        the software is executed by the hardware,
        after provisioning of the DCE, a user interacts with the software; and
    obtain feedback information from the DCE, wherein the feedback information describes a plurality of interactions between the user and the DCE.

16. The computer readable storage medium of claim 15, wherein the program instructions are further executable to:
    based on the feedback information, perform one of: reconfiguring the software, re-installing the software, or modifying the dynamic computing environment.

17. The computer readable storage medium of claim 15, wherein the program instructions are executable to obtain the feedback information from a tracking and monitoring software program executing on the dynamic computing environment.

18. The computer readable storage medium of claim 15, wherein the program instructions are further executable to use the dynamic computing environment to transition from a sales cycle to customer ownership, wherein
    using the dynamic computing environment to transition from the sales cycle to customer ownership comprises saving a preferred configuration of the dynamic computing environment for the software.

19. A computer readable storage medium storing program instructions executable to:
    automatically provision a dynamic computing environment according to a first configuration, wherein the dynamic computing environment comprises a network;
    facilitate interaction between the dynamic computing environment and a sales representative, wherein the sales representative interacts with the dynamic computing environment to perform at least one of: installing software and operating the software in the first configuration of the dynamic computing environment; and
    automatically provision the dynamic computing environment according to a second configuration.

20. The computer readable storage medium of claim 19, wherein the program instructions are further executable to:
    receive user input specifying the first configuration, wherein
        the dynamic computing environment is automatically provisioned according to the first configuration in response to receipt of the user input; and
    receive additional user input specifying the second configuration, wherein
        the dynamic computing environment is automatically provisioned according to the second configuration in response to receipt of the additional user input.

21. The computer readable storage medium of claim 20, wherein the program instructions are further executable to:
    generate monitoring information describing one or more interactions between a customer and the software; and
    provide the monitoring information to the sales representative.

22. A system comprising:
    means for provisioning a dynamic computing environment (DCE) comprising a network, wherein
        provisioning the DCE comprises provisioning hardware and software, and
        the software is executed by the hardware;
    means for facilitating interaction between a user and the software; and
    means for obtaining feedback information from the DCE, wherein the feedback information describes a plurality of interactions between the user and the DCE.

23. The system of claim 22, further comprising:
    based on the feedback information, perform one of: reconfiguring the software, re-installing the software, or modifying the dynamic computing environment.

24. The system of claim 22, wherein the feedback information is obtained from a tracking and monitoring software program executing on the dynamic computing environment.

25. The system of claim 22, further comprising:
    means for using the dynamic computing environment to transition from the sales cycle to customer ownership, wherein the means for using the dynamic computing environment comprise means for saving a preferred configuration of the dynamic computing environment for the software.

26. A system comprising:
    means for automatically provisioning a dynamic computing environment according to a first configuration, wherein the dynamic computing environment comprises a network;
    means for facilitating interaction between the dynamic computing environment and a sales representative, wherein the sales representative interacts with the dynamic computing environment to perform at least one of: installing software and operating the software in the first configuration of the dynamic computing environment; and means for automatically provisioning the dynamic computing environment according to a second configuration.

27. The system of claim 26, further comprising:

means for receiving user input specifying the first configuration, wherein the dynamic computing environment is automatically provisioned according to the first configuration in response to receipt of the user input; and means for receiving additional user input specifying the second configuration, wherein the dynamic computing environment is automatically provisioned according to the second configuration in response to receipt of the additional user input.

28. The system of claim 26, further comprising:

means for generating monitoring information describing one or more interactions between a customer and the software; and means for providing the monitoring information to the sales representative.

* * * * *